(12) United States Patent
Coffey, Jr. et al.

(10) Patent No.: US 7,789,048 B2
(45) Date of Patent: Sep. 7, 2010

(54) ELECTROLYZER POWERED BY STEAM TURBINE IN AN ENGINE EXHAUST PIPE

(76) Inventors: Ray Stratton Coffey, Jr., 134 Jefferson Ct., Staunton, VA (US) 24401; Jacob D. Cox, 217 Walker St., Lexington, VA (US) 24450

( * ) Notice: Subject to any disclaimer, the term of this patent is extended or adjusted under 35 U.S.C. 154(b) by 177 days.

(21) Appl. No.: 12/077,922

(22) Filed: Mar. 24, 2008

(65) Prior Publication Data

US 2009/0235902 A1    Sep. 24, 2009

(51) Int. Cl.
*F02B 43/08* (2006.01)
(52) U.S. Cl. .................... 123/3; 123/DIG. 12
(58) Field of Classification Search ............ 123/1 A, 123/2, 3, DIG. 12
See application file for complete search history.

(56) References Cited

U.S. PATENT DOCUMENTS

| | | | |
|---|---|---|---|
| 5,785,138 A | 7/1998 | Yoshida | |
| 6,783,750 B2 | 8/2004 | Shah et al. | |
| 6,820,706 B2 | 11/2004 | Ovshinsky et al. | |
| 6,939,449 B2 | 9/2005 | Streckert et al. | |
| 7,267,699 B2 | 9/2007 | Kamijo | |
| 7,273,044 B2 | 9/2007 | Flessner et al. | |
| 7,337,612 B2 | 3/2008 | Skinnes et al. | |
| 7,340,129 B2 | 3/2008 | Yalin et al. | |
| 7,401,578 B2 * | 7/2008 | Otterstrom et al. | 123/3 |
| 2002/0117125 A1 * | 8/2002 | McMaster et al. | 123/3 |
| 2004/0144336 A1 * | 7/2004 | Zagaja et al. | 123/3 |

* cited by examiner

*Primary Examiner*—Noah Kamen

(57) ABSTRACT

A method for providing fuel for vehicle or power plant engines, including disassociating water into hydrogen and oxygen by electrolysis and catalysing the reformation of water vapor by spark catalysis is disclosed. The apparatus according to the invention incorporates utilization of a steam turbine and solar panels to provide additional electrical energy for electrolysis of the water fuel.

1 Claim, 2 Drawing Sheets

ELECTROLYZER POWERED BY STEAM TURBINE IN AN ENGINE EXHAUST PIPE

BACKGROUND OF THE INVENTION

1. Field of the Invention

This invention relates generally to providing a process and apparatus for operating a vehicle or power plant solely on water for fuel.

2. Description of the Related Art Including Information Disclosed Under 37 CFR 1.97 and 1.98.

The need for more economical energy sources is evident to many Americans. Hybrid automobiles, using electrical energy to reduce oil use, ethanol powered cars and hydrogen engines are all useful. The invention described herein is in alignment with these attempts to provide economical power and transportation.

Skinnes, et al, in U.S. Pat. No. 7,337,612 described a method for operating an engine by cyclic thermochemical processes in place of a combustion reactor. The invention disclosed herein differs from U.S. Pat. No. 7,337,612 in that chemicals other than water are not required, and a spark of some sort is utilized to catalyze the energy producing reaction.

Motohisa Kamijo, in U.S. Pat. No. 7,267,699, illuminated a fuel processing system for reforming hydrocarbon fuel. The process and apparatus in the present invention is a simplification in that it does not require hydrocarbon fuel.

Ovshinsky, et al, presented a hydrocarbon powered internal combustion engine in U.S. Pat. No. 6,820,706. The innovation described in this application does not require combustion or a continuous stream of air.

Shah, et al, produced a design for a hydrogen production method, creating synthesis gas, and involving combustion, in U.S. Pat. No. 6,783,750. The invention currently applied for requires neither synthesis gas or combustion.

Flessner, et al, U.S. Pat. No. 7,273,044, describes an electrolyzer for generating hydrogen and oxygen, exhaust gas being recycled through the electrolyzer, and hydrogen and oxygen stored in pressurized tanks, an air intake port open to the atmosphere, an expander, pressurized tanks, compressors and catalytic converters among other equipment are required which add to the weight and lower vehicle efficiency in the case of transportation embodiments. In addition, pressurized tanks of these gases may lead to spectacular explosions in the event of automobile collisions, which are an everyday event in the US.

Emil Riegel, in Industrial Chemistry, 1937, outlines the voltages necessary for decomposition of water, with 25% sodium hydroxide addition, and gives the opinion that electrolysis is the method of choice where hydrogen and oxygen are required for operation of a method and apparatus.

Yalin, et al, in U.S. Pat. No. 7,340,129, describes optical spark plug equipment useful in a water reformation engine.

In the webpage www.geocities.com/hydrogenpower1/experiments/simple_electrolyzer.html a simple electrolyzer is demonstrated which produces one gallon per hour of gas, using 12 volts and 2 amps.

The webpage www.waterfuelcell.org/WFCprojects/Tero/series_cell_v1.2.pdf provides the information that 4000 liters of oxyhydrogen gas from unsegregatdd electrolysis of water must be produced to equal the fuel energy of gasoline. Further, 3000 liters per hour of this oxyhydrogen gas would be required to idle a car engine.

In the webpage www.brownsgas.com/brownsgaswaterasfuel.html Jules Verne is referenced from his novel Mysterious Island, 1871, supporting the theory that water decomposed by electricity will one day be used as fuel.

BRIEF SUMMARY OF THE INVENTION

An object of the invention is to provide a simplified method for converting water into fuel for vehicles and power plants.

Another object of the invention is to provide an apparatus resulting from the method noted above.

According to one aspect of the present invention, there is provided a method for conversion of water into hydrogen and oxygen by electrolysis, conducting these gases separately to various combustion chambers, stimulating their reaction by optical or conventional sparkplug firing, the resulting reformation of water resulting in the release of energy and heat to drive the pistons of said combustion chambers. Further, a method is provided to conduct said water to extravasate back into the electrolysis chamber.

According to another aspect of the present invention, there is provided a power producing apparatus, which comprises an electrical generation system, electrolyzer, conventional reciprocating engine with spark plugs of either conventional or optical nature, condensing system to convert the water vapor into its liquid form, pipes to convey the resultant liquid to the electrolyzer chamber, and a pressure release emergency valve.

These and other advantages, features and objects of the invention will be appreciated upon review of the following description of the invention when comprehended in conjunction with the attached drawings with the understanding that modifications, variations and alterations may be accomplished by those skilled in the art of the field of the disclosed invention without departing from the spirit or scope of the claims appended hereto.

DETAILED DESCRIPTION OF THE INVENTION

To obtain the objects as noted above the inventors analyzed established and innovative power generation systems with a view to reducing cost and environmental impact of power production. It was discovered that electrolysis has long been acknowledged to be the choice method where hydrogen and oxygen production are required from water, that water breakdown and reformation is adequate to power gasoline fueled engines, that said reformed water may be conducted back to the electrolyzer for a closed loop fuel production and use system, and that no environmentally harmful emissions will result. The invention is predicated in these findings.

More particularly, the present invention features the method of connecting the electrolyzer to the battery system of a vehicle engine or power plant, the electrolyzer chamber being divided with a central partition extending below the water level. This provides a hydrogen chamber in the cathode section, and an oxygen chamber in the anode section. A chimney at the top of each chamber conducts the gases independently to the intake manifold for the engine. The engine, typical of any manufactured by the world automakers, contains sparkplugs of conventional or optical nature which catalyse the reformation of water from hydrogen and oxygen gas. The resultant gas expansion drives the cylinder pistons of the engine as the gasoline explosions drive the cylinder pistons in conventional gasoline combustion engines. The steam water vapor resulting from this water reformation is conducted from the engine, as the gasoline combustion byproducts are conducted from a conventional gasoline engine. Instead of being exhausted to our atmosphere, however, the water vapor is passed through a steam turbine, generating electrical energy which is fed to the battery system. Exiting the turbine, the vapor passes to a thermostat which routes the water vapor to a radiator if the vapor is of too high a temperature to be fed directly back to the electrolyzer. If the vapor is cool enough it is fed directly back to the electrolyzer. A solar panel system connected to the battery assembly provides additional electrical energy to start and maintain the electrolysis process.

Now, preferred embodiments of the invention will be described with reference to the drawings.

Figure 1:
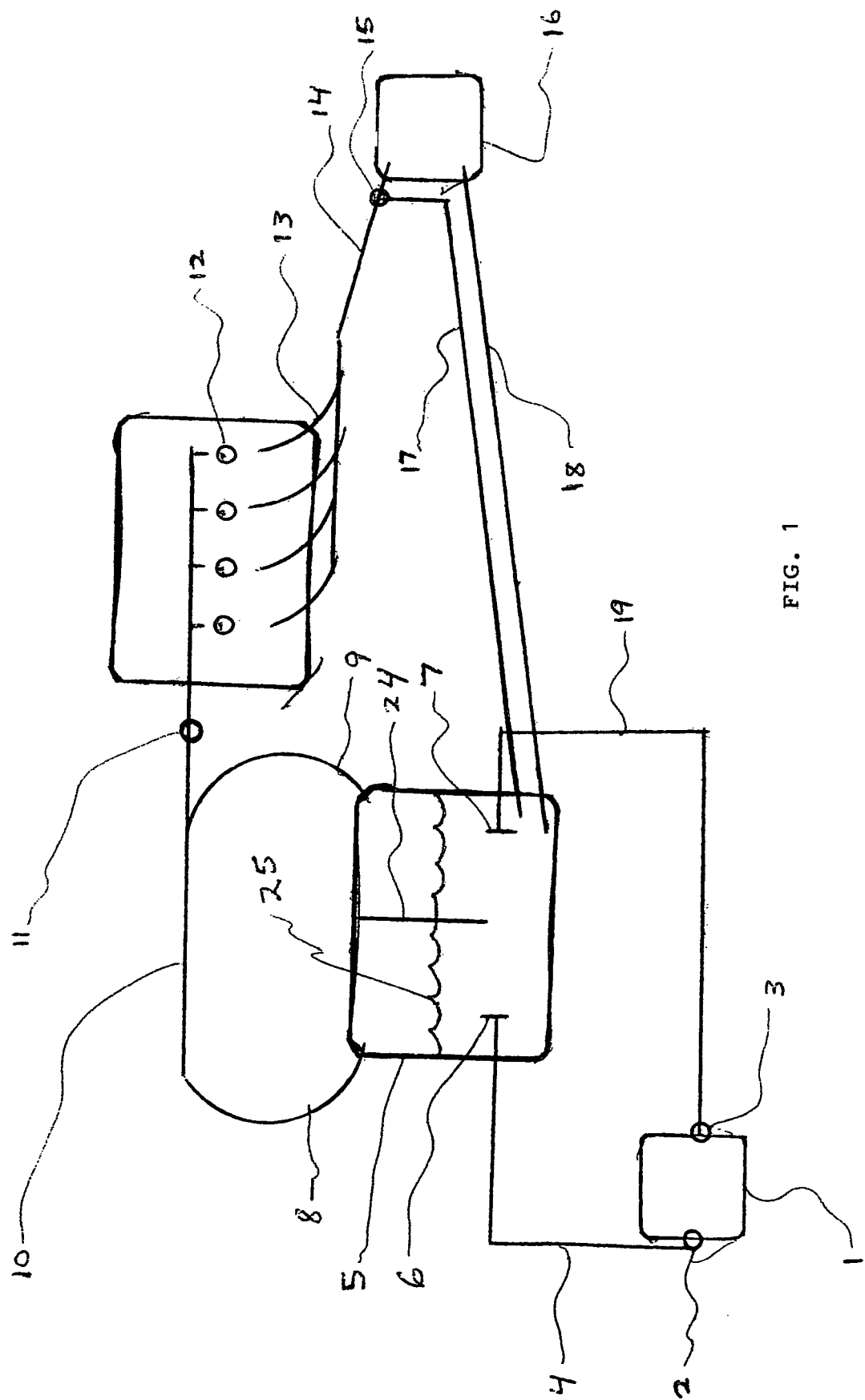
FIG. 1 is a side view of the core apparatus claimed as the invention.

FIG. 1 is a side view of the invention, illustrating the primary embodiment. More specifically, the Figure shows an apparatus, which comprises a battery system 1, containing a c cathode 2 and anode 3. Cathode 2 is connected by wire 4 to hydrogen generating electrode 7. These electrodes 6 and 7 are contained within electrolyzer 5, which is filled with water and a 25% sodium hydroxide mixture to level 25. Partition 24 separates the hydrogen produced by electrode 6 from the oxygen produced by electrode 7. Hydrogen is conducted by chimney pipe 8 to the fuel manifold, and oxygen is conducted by chimney pipe 9 to the fuel manifold. Pressure relief valve 11 is provided in case of engine malfunction. The reun reunited hydrogen and oxygen mixture enters the cylinders inside the engine, and are catalysed to react by optical or conventional sparkplugs, one of which is shown as 12. The resultant water vapor exits the engine, as this is a conventional car engine, and passes into exhaust pipes, one of which is illustrated as 13. Exhaust manifold 14 conducts the vapor to thermostat 15, which directs the vapor to the radiator 16 if the temperature of the vapor is too high to be fed directly into the electrolyzer chamber from where it originated. If the vapor temperature is low enough, the thermostat directs the vapor back to the electrolyzer chamber for another cycle of water dissassociation and reassociation.

Figure 2:
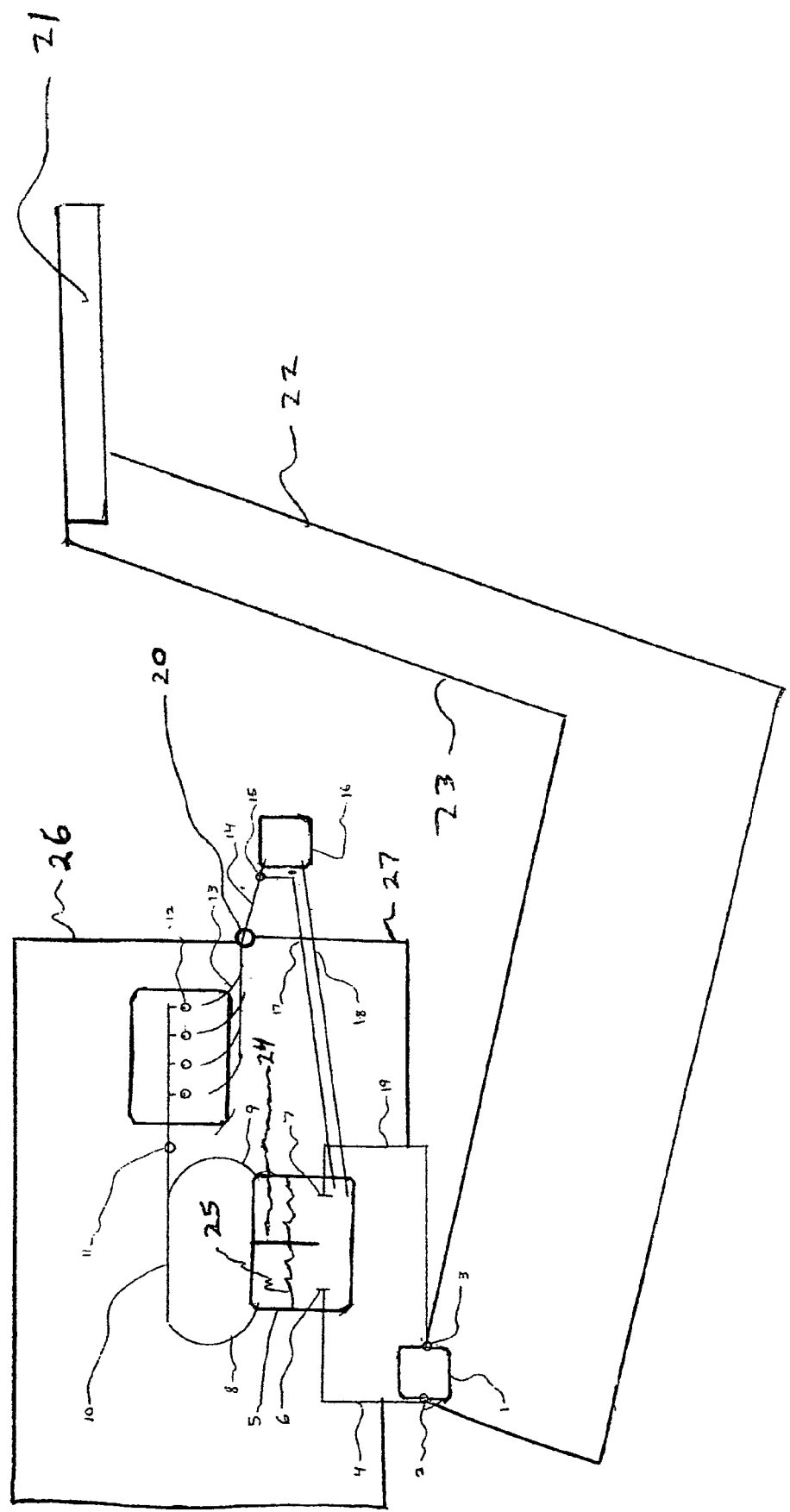
FIG. 2 is a side view of the apparatus claimed, including solar panel and steam turbine.

FIG. 2 is a side view of another embodiment of the present invention. The components are identical to those in FIG. 1, with the addition of a turbine 20 located on the exhaust manifold 14. The electrical energy produced by the water vapor steam passing through turbine electrical generator combination 20 is conducted by wire 26 to the cathode of the battery system, and by wire 27 to the anode of the battery system. Solar panel assembly 21, placed on the roof of the vehicle or other suitable location, provides electrical energy to the battery system cathode by wire 22, and electrical energy to the battery system anode by wire 23.

The invention claimed is:

1. An apparatus for producing fuel for engines from water comprising:

a battery and a solar panel connected to an electrolyzer which has separate outlet pipes for the venting of hydrogen and oxygen, a manifold combining the pipes leading to an internal combustion engine, ignition means consisting one of spark plugs and optical igniters in the engine, an exhaust manifold connected to outlets of the engine that directs the resultant steam generated by the combustion of the hydrogen and oxygen in the engine, a steam turbine driven by the steam in the exhaust manifold and an electric generator driven by the turbine which in turns is connected to the battery, a thermostat in the exhaust manifold downstream of the turbine for selectively directing the steam to a radiator to condense the steam into water, a pipe directing the condensed water back to the electrolyzer.

* * * * *